(12) United States Patent
Acharya et al.

(10) Patent No.: US 7,133,555 B2
(45) Date of Patent: Nov. 7, 2006

(54) IMAGE COLOR MATCHING SCHEME

(75) Inventors: Tinku Acharya, Chandler, AZ (US);
Tamalika Chaira, West Bengal (IN);
Ajay K. Ray, West Bengal (IN)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 10/211,161

(22) Filed: Aug. 2, 2002

(65) Prior Publication Data

US 2004/0022433 A1 Feb. 5, 2004

(51) Int. Cl.
*G06K 9/00* (2006.01)
*G06K 9/68* (2006.01)

(52) U.S. Cl. ....................... 382/167; 382/219

(58) Field of Classification Search ................ 382/162, 382/167, 168, 217, 218, 305, 170–173, 165, 382/219; 706/52; 707/3, 6; 708/52; 358/518, 358/520, 522, 523
See application file for complete search history.

(56) References Cited

U.S. PATENT DOCUMENTS

| | | | |
|---|---|---|---|
| 5,982,931 A * | 11/1999 | Ishimaru ..................... 382/218 |
| 6,446,060 B1 * | 9/2002 | Bergman et al. ................ 707/3 |
| 6,584,223 B1 * | 6/2003 | Shiiyama ..................... 382/173 |
| 6,744,935 B1 * | 6/2004 | Choi et al. ................... 382/305 |
| 6,868,411 B1 * | 3/2005 | Shanahan ...................... 706/52 |
| 6,876,999 B1 * | 4/2005 | Hill et al. ....................... 707/3 |
| 2002/0009231 A1 * | 1/2002 | Yamamoto et al. ......... 382/217 |

* cited by examiner

*Primary Examiner*—Amir Alavi
(74) *Attorney, Agent, or Firm*—Joni D. Stutman-Horn

(57) ABSTRACT

Embodiments of a color image matching scheme are disclosed. In one embodiment, a pixel intensity count is determined for color components of color images in a database and for a query color image. A fuzzy similarity and/or a fuzzy dissimilarity between the query image and the database images is computed based at least in part on the pixel intensities counts. An image is selected from the database based at least in part on the computed fuzzy similarity and/or dissimilarity, where computing a fuzzy similarity and/or dissimilarity includes computing the matching intensity. Other embodiments are described and claimed.

19 Claims, 1 Drawing Sheet
(1 of 1 Drawing Sheet(s) Filed in Color)

Sample database images of fabric are shown below

Fabric02

Fabric03

Fabric08

Fabric09

Fabric10

Fabric13

Fabric14

Sample database images of food are shown below

Food00

Food01

Food02

Food06

Food07

Food08

Food09

Sample database images of fabric are shown below

Fabric02

Fabric03

Fabric08

Fabric09

Fabric10

Fabric13

Fabric14

IMAGE COLOR MATCHING SCHEME

BACKGROUND

This disclosure relates to image processing and, in particular, to retrieval of an image from a database of color images.

The problem of retrieval of a query image from a database of color images has received attention in recent times due at least in part to exploration of Internet usage. For example, retrieval of a query image from a database of images is a task employed in the area of digital imaging, computer vision, and many other multimedia applications. Image retrieval using similarity measures has been observed to be an elegant technique for Content Based Image Retrieval (CBIR) systems. The task of image matching involves determining the mutual correspondence between two images in a set of database images. Content-based query systems process a query image at least in part on the basis of a classification procedure that assigns the unknown query image to the closest available image in the database. The performance of the CBIR system typically depends on several factors that usually involve extracting a set of features that constitute the image and then identifying suitable similarity measures, based on image distance function.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Figure 1:
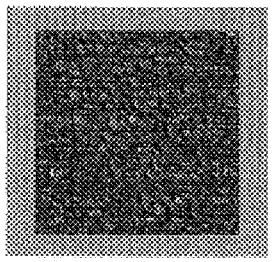
FIG. 1 illustrates sample images to which an embodiment may be applied.
Figure 1:
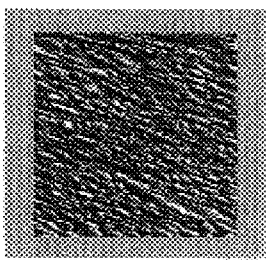
Figure 1:
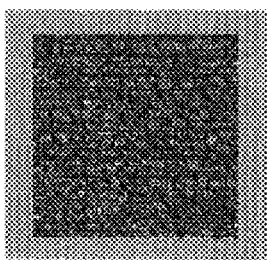
Figure 1:
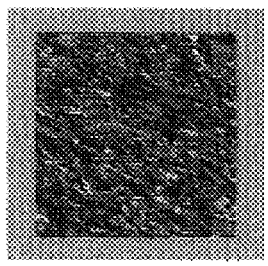
Figure 1:
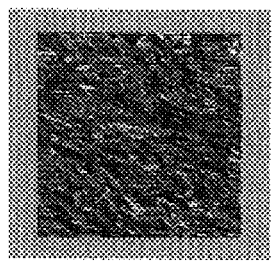
Figure 1:
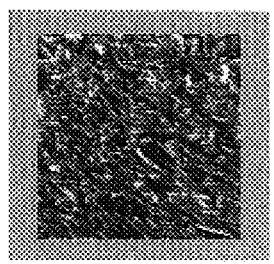
Figure 1:
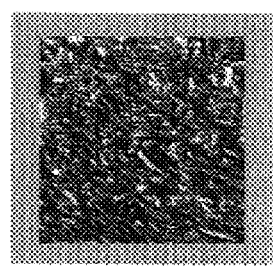

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

In one particular embodiment of a color matching scheme, described hereinafter, histograms relating to red (R), green (G) and blue (B) components of color images are compared and a final assignment is based at least in part on a fuzzy similarity and/or dissimilarity measure between the images. Thus, for this embodiment, the retrieval of a query image is based at least in part on fuzzy based similarity/dissimilarity measures between two images. For computing the similarity and/or dissimilarity of images, the fuzzy membership values for the color pixel intensities for both the database images and the query image are initially computed from a color histogram. However, the claimed subject matter is not limited in scope to this particular embodiment. For example, any color scheme may be employed. Likewise, other techniques to perform the desired color calculations other than employing histograms may be utilized, as explained below.

In one particular embodiment, to determine or compute the membership grades of the pixel intensity values of an image, here the database images and the query image, for example, histograms of images in the database are computed. The maximum count values for three color components, for example in this embodiment, R, G and B, of an image is computed or determined. For example, this is performed for a database of color images. Next, for the database of images, the largest of these maximum count values $R_{max}$, $G_{max}$ and $B_{max}$ are computed, here for R, G and B components. For a given image, the histograms of the R, G and B components are normalized by $R_{max}$, $G_{max}$ and $B_{max}$ respectively.

In one particular embodiment, a feature based similarity/dissimilarity measure is based at least in part on a model of human similarity judgment, which takes into account common features and distinctive or distinguishing features. This means that the similarity assessment is based at least in part on evaluating features that both the images (say A and B) have or features that one has and the other does not have. Common features between two images are denoted by the intersection of the common properties of the two images, e.g., features that are common to both the images. Distinctive or dissimilar features, on the other hand, highlight differences between the two images, implying those features that are present in image A but, not present in image B, e.g., (A−B) and vice versa, e.g., (B−A).

In this context, referring to the intensities of the color components of an image refers to gray level values for the particular color component. Let set A represents the membership values of those pixel intensities for a database image. Thus, the membership values refer to the gray levels of the histogram of the database image for a particular color component. Likewise, let set B represent the corresponding membership values of the pixel intensities levels of the query image. The common feature in this paradigm then is the intersection of the normalized count values for that color component of the two images. The greater the overlap of intensity values, the greater the intersection and the more the similarity.

In contrast, the distinctive features in this context are those color features, which are present in A, but not in B, and vice-versa. This implies that the intersection of the membership of the pixel intensities, computed from the count of the gray level for a color component of image A and the complement of the membership of the corresponding values of the image B provides a potential measure of distinctiveness or dissimilarity. The greater the membership value of a count of a gray level for a color component of the image, the less is the distinctiveness. This observation may be modeled, for this particular embodiment, according to the Tversky model [A. Tversky, Psychological Reviews (1977) 84 (4) pages 327–352]. Using this model, an appropriate measure of "fuzzy match" between two images, referred to here as "matching intensity" or M.I. may be given by the following relationship:

$$\text{M.I.}(A, B; \alpha, \beta) = \frac{f(A \cap B)}{f(A \cap B) + \alpha \cdot f(A - B) + \beta \cdot f(B - A)} \quad [1]$$

This may further be written as $$M.I.(A, B; \alpha, \beta) = \frac{\sum_{i=1}^{p} \min(\mu_i(a), \mu_i(b))}{\sum_{i=0}^{p} (\min(\mu_i(a), \mu_i(b)) + \alpha \cdot \min(\mu_i(a), 1 - \mu_i(b)) + \beta \cdot \min(1 - \mu_i(a), \mu_i(b)))} \quad [2]$$

Note that M.I. is computed for a particular color component. Thus, here $\mu_i(.)$ refers to a particular count value for a gray level or intensity of a particular color component. Likewise, here, $\alpha$ and $\beta$ have been chosen to be 0.5. Of course, the claimed subject matter is not limited in scope to this particular value for these parameters.

To determine or calculate fuzzy similarity/dissimilarity for this particular embodiment, the membership values of the counts of the gray levels of the color components are computed, as previously indicated. With this data or information, the similarity/dissimilarity values for the color images may be computed using the histograms from the respective images of the gray values for the color components. Of course, the claimed subject matter is not limited in scope to employing the relationship above in equation [2]. Other measures of fuzzy similarity and/or dissimilarity based at least in part on the histograms may be employed and such measures remain within the scope of the claimed subject matter. Likewise, the claimed subject matter is not limited in scope to employing histograms. For examples, representative values for the color components, such as mean or variance, for example, may be employed to compute fuzzy similarity and/or dissimilarity for the images.

In this particular embodiment, the overall matching similarity/dissimilarity may be computed from the sum of the similarities/dissimilarities of the three color components of an image. The query image may then be assigned a matching image from the database according to the maximum similarity measure. However, again, the claimed subject matter is not limited in scope to this precise approach. For example, instead of the sum of the similarities/dissimilarities, other approaches to combining the color components may be employed within the scope of the claimed subject matter. For example, it may be desirable to emphasize some color components and de-emphasize others, depending on the particular application or color components employed. Likewise, the claimed subject matter is not limited in scope to employing a maximum value. For example, depending on the measurement approach, it may be desirable that another extreme value other than the maximum be selected, such as, for example, a minimum.

Experimental results of applying the previously described embodiment demonstrate the power of this approach. FIG. 1 provides sample images, for example. The results of the retrieved images are given below:

| Database Image | Query image Food01 | Query image Food02 | Query image Food08 |
|---|---|---|---|
| Food00 . . . | 1.2091 | 1.5550 | 1.3423 |
| Food01 . . . | 1.8069 | 1.2662 | 1.6040 |
| Food02 . . . | 1.2662 | 1.6141 | 1.3892 |
| Food06 . . . | 1.6129 | 1.3985 | 1.6571 |
| Food07 . . . | 1.6050 | 1.4006 | 1.6516 |

-continued

| Database Image | Query image Food01 | Query image Food02 | Query image Food08 |
|---|---|---|---|
| Food08 . . . | 1.6040 | 1.3892 | 1.6651 |
| Food09 . . . | 1.6040 | 1.3892 | 1.6651 |

Figure 2:
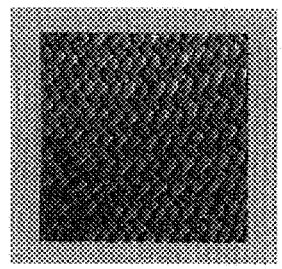
FIG. 2 illustrates additional sample images to which an embodiment may be applied.
Figure 2:
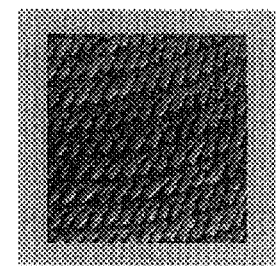
Figure 2:
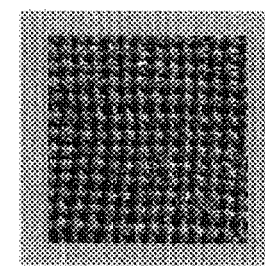
Figure 2:
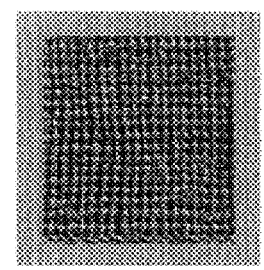
Figure 2:
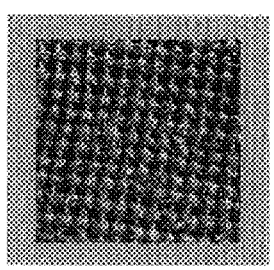
Figure 2:
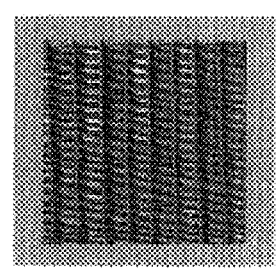
Figure 2:
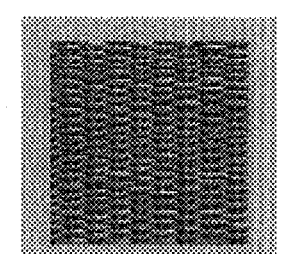

FIG. 2 provides additional sample image for which experimental results were obtained. The results for these images are given in the table below.

| Database Image | Query image Fabric02 | Query image Fabric10 | Query image Fabric13 |
|---|---|---|---|
| Fabric02 . . . | 1.9684 | 1.2352 | 1.2603 |
| Fabric03 . . . | 1.7556 | 1.2476 | 1.3260 |
| Fabric08 . . . | 1.2053 | 1.5157 | 1.3482 |
| Fabric09 . . . | 1.2083 | 1.4458 | 1.3690 |
| Fabric10 . . . | 1.2352 | 1.5438 | 1.3525 |
| Fabric13 . . . | 1.3813 | 1.3783 | 1.4898 |
| Fabric14 . . . | 1.2603 | 1.3525 | 1.6245 |

One aspect of this particular embodiment is color imagery matching based at least in part on fuzzy similarity and/or dissimilarity measure techniques. The technique is robust because of inherent fuzzy characteristics of images themselves. Moreover, a fuzzy similarity measurement technique, such as, for example, the previously described embodiment, resembles in some respects, similarity detection based on human judgment due at least in part to the fuzzy nature of such judgments. As a result, these techniques provide good results compared to "crisp set" approaches applied to make such matching determinations.

Although particular embodiments of the claimed subject matter are described, included within the scope of the claimed subject matter is the extraction of fuzzy features e.g., fuzzy moment features, fuzzy texture features etc., to provide a generalized fuzzy matching scheme.

It will, of course, be understood that, although particular embodiments have just been described, the claimed subject matter is not limited in scope to a particular embodiment or implementation. For example, one embodiment may be in hardware, such as implemented to operate on an integrated circuit chip, for example, whereas another embodiment may be in software. Likewise, an embodiment may be in firmware, or any combination of hardware, software, or firmware, for example. Likewise, although the claimed subject matter is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging or video system, for example, may result in an embodiment of a method in accordance with the claimed subject matter being executed, such as an embodiment of a method of image color matching, for example, as previously described. For example, an image or video processing platform or another processing system may include a video or image processing unit, a video or image input/output device and/or memory.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

What is claimed is:

1. A method of matching color images comprising:
determining pixel intensity count for color components of color images in a database and for a query color image;
computing a fuzzy similarity and/or a fuzzy dissimilarity between the query image and the database images based at least in part on the pixel intensities counts;
selecting an image from the database based at least in part on the computed fuzzy similarity and/or dissimilarity, wherein computing a fuzzy similarity and/or dissimilarity includes computing the matching intensity, given by the following relationship:

$$\frac{\sum_{i=1}^{P} \min(\mu_i(a), \mu_i(b))}{\sum_{i=0}^{P} (\min(\mu_i(a), \mu_i(b)) + \alpha \cdot \min(\mu_i(a), 1 - \mu_i(b)) + \beta \cdot \min(1 - \mu_i(a), \mu_i(b)))}.$$

2. The method of claim 1, wherein the color components of the database images and the query image comprise red, green and blue (R, G, B).

3. The method of claim 1, wherein only the fuzzy similarity is computed and the image from the database is selected based at least in part on the computed fuzzy similarity.

4. The method of claim 1, wherein only the fuzzy dissimilarity is computed and the image from the database is selected based at least in part on the computed fuzzy dissimilarity.

5. The method of claim 1, wherein determining the pixel intensity count includes constructing histograms.

6. The method of claim 1, wherein an image is selected from the database based at least in part on an extreme value of the fuzzy similarity and/or dissimilarity.

7. The method of claim 6, wherein the extreme value comprises the maximum value.

8. An article comprising: a computer readable storage medium having stored thereon instructions that, when executed on a machine, result in performance of the following method of color image matching:
determining pixel intensity count for color components of color images in a database and for a query color image;
computing a fuzzy similarity and/or a fuzzy dissimilarity between the query image and the database images based at least in part on the pixel intensities counts;
selecting an image from the database based at least in part on the computed fuzzy similarity and/or dissimilarity, wherein the instructions, when executed, result in computing a fuzzy similarity and/or dissimilarity including computing the matching intensity, given by the following relationship:

$$\frac{\sum_{i=1}^{P} \min(\mu_i(a), \mu_i(b))}{\sum_{i=0}^{P} (\min(\mu_i(a), \mu_i(b)) + \alpha \cdot \min(\mu_i(a), 1 - \mu_i(b)) + \beta \cdot \min(1 - \mu_i(a), \mu_i(b)))}.$$

9. The article of claim 8, wherein the color components of the database images and the query image comprise red, green and blue (R, G, B).

10. The article of claim 8, wherein the instructions, when executed, result in only the fuzzy similarity being computed and the image from the database being selected based at least in part on the computed fuzzy similarity.

11. The article of claim 8, wherein the instructions, when executed, result in only the fuzzy dissimilarity being computed and the image from the database being selected based at least in part on the computed fuzzy dissimilarity.

12. The article of claim 8, wherein the instructions, when executed, result in determining the pixel intensity count including constructing histograms.

13. The article of claim 8, wherein the instructions, when executed, result in an image being selected from the database based at least in part on an extreme value of the fuzzy similarity and/or dissimilarity.

14. The article of claim 13, wherein the instructions, when executed, result in the extreme value comprising a maximum value.

15. A method of matching color images comprising:
determining pixel intensity count for color components of color images in a database and for a query color image;
computing a fuzzy similarity and/or a fuzzy dissimilarity between the query image and the database images based at least in part on the pixel intensities counts;
selecting an image from the database based at least in part on the computed fuzzy similarity and/or dissimilarity, wherein computing a fuzzy similarity and/or dissimilarity includes computing the matching intensity.

16. The method as recited in claim 15, wherein computing a fuzzy similarity and or fuzzy dissimilarity further comprises utilizing representative values for the color components, said values selected from the group of values consisting of mean and variance.

17. The method as recited in claim 16, wherein overall matching similarity/dissimilarity is computed from a sum of similarities/dissimilarities of the color components of an image, the color components comprising red, green and blue (R, G, B).

18. The method as recited in claim 17, wherein at least one color component is emphasized and at least one color component is de-emphasized based on at least one of a particular application and color components employed.

19. The method of claim 15, wherein an image is selected from the database based at least in part on a minimum value of the fuzzy similarity and/or dissimilarity.

* * * * *